United States Patent [19]

Heath et al.

[11] Patent Number: 4,890,219
[45] Date of Patent: Dec. 26, 1989

[54] MODE CONVERSION OF COMPUTER COMMANDS

[75] Inventors: Chester A. Heath, Boca Raton; Kevin M. Jackson, Delray Beach; Darryl E. Judice, Boynton Beach; Hoshang R. Pestonji, Coral Springs, all of Fla.

[73] Assignee: International Business Machines Corporation, Armonk, N.Y.

[21] Appl. No.: 29,511

[22] Filed: Mar. 24, 1987

[51] Int. Cl.⁴ .............................................. G06F 5/00
[52] U.S. Cl. .................. 364/200; 364/232.9; 364/241.2
[58] Field of Search ........................... 364/200, 900

[56] References Cited

U.S. PATENT DOCUMENTS 3,938,101  2/1976  Lewis et al.

FOREIGN PATENT DOCUMENTS 169565   1/1986  European Pat. Off.
0192944  3/1986  European Pat. Off.
1094696  9/1986  European Pat. Off.

OTHER PUBLICATIONS

New Electronics, Nov. 1986, p. 24; W. Millar "Interfacing the ADC0808".
IBM Technical Disclosure Bulletin, vol. 29, No. 6, Nov. 1986, pp. 2380-2381, Interrupt Sharing for Personal Computer.
IBM Technical Discl. Bull., vol. 28, No. 11, Apr. 1986, pp. 4971-4972, "Hardware Interrupt Vectoring Circuit for Non—Compatible Peripherals".
IBM Technical Disclosure Bulletin, vol. 29, No. 6, Nov. 1986, pp. 2380-2381, "Interrupt Sharing for Personal Computers".
IBM Technical Disclosure Bulletin, vol. 25, No. 9, pp. 4651-4655, G. Davis, "Signature Analysis Testing".
Manual Excerpt: "8259A/8259A-2/8259A-8 Programmable Interrupt Controller", Microsystems Components Handbook, vol. 1, 1984, Intel Corporation, Front Cover, front is piece, pp. 2-120 to 2-136.

Primary Examiner—Thomas M. Heckler
Attorney, Agent, or Firm—George E. Grosser; Philip R. Wadsworth

[57] ABSTRACT

A personal computer system which associated interrupt controller is preferably designed to operate with programs and respond to interrupt related commands in one mode, such as level sensitive mode, but is provided with circuitry that enables the system to convert and respond to interrupt-related software commands in another mode, such as edge sensitive (triggered) mode, the system there treating the edge mode signals just as if they were level mode signals.

12 Claims, 6 Drawing Sheets

| (+) 10W | (+) TRAP | (+) GATE | |
|---|---|---|---|
| 0 | 0 | 0 | IDLE |
| 0 | 1 | 0 | IDLE |
| 1 | 0 | 1 | VALID WRITE |
| 1 | 1 | 0 | ICW1 WRITE |

| $\overline{10W}$ | 10W | |
|---|---|---|
| $\overline{TRAP}$ | 0 | 1 |
| TRAP | 0 | 0 |

$+ \text{GATE} = (+10W)(\overline{TRAP})$
$= \overline{(+10W)[(A0)(D4)]}$

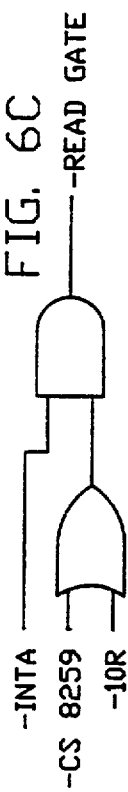

MODE CONVERSION OF COMPUTER COMMANDS

BACKGROUND OF THE INVENTION

This invention relates to computer systems with interrupt controllers and more particularly to more efficient systems that are conditioned to convert and respond to interrupt-related software commands that are normally incompatible with the system.

Systems of this nature have been described heretofore, such as the IBM Personal Computers XT and AT*, (*Personal Computer XT is a trademark and Personal Computer AT is a registered trademark of International Business Machines Corporation) which have one or more programmable interrupt controllers interconnected in the system which handle the interrupts in the system and thereby relieve the Central Processor Unit (CPU) from software and processing overhead. A representative interrupt controller of this nature is the Intel* 8259A Programmable Interrupt Controller (PIC) which handles up to eight vectored priority interrupts for the CPU. (*Intel is a registered trademark of Intel Corporation). The 8259A features are described for example, in the Intel "Microsystem Components Handbook", 1984, Pp 2-120 to 2-137. The 8259A PIC can be programmed by software commands to respond to edge or level triggered interrupt modes. It is desirable with certain computer systems to operate primarily with software that uses only interrupt-related software commands in one mode but to be responsive to interrupt-related software commands from other system configurations or programs that are based on a different mode.

SUMMARY OF THE INVENTION

In accordance with the present invention, a personal computer system with associated interrupt controller is preferably designed to operate with programs and respond to interrupt-related software commands in one mode, such as level sensitive mode, but is provided with circuitry that enables the system to convert and respond to interrupt-related software commands in another mode, such as edge sensitive (triggered) mode, the system thereby treating the edge mode signals in a compatible manner just as if they were level mode signals.

In the practice of the present invention a significant advantage is gained since software, including applications programs, that would otherwise be incompatible are rendered compatible and a large number of such programs can be used on the system.

In the preferred embodiment described, the personal computer system utilizes software that normally supplies only level sensitive interrupt commands at all times. It is desirable to be able to use otherwise incompatible software that supplies edge sensitive interrupt commands. Circuit logic is added to the level sensitive system which intercepts all incoming edge sensitive interrupt commands and treats them in the same manner as level sensitive commands.

The principles of response and conversion can be applied to the converse situation i.e., edge vs. level commands as well as to treatment of command types other than interrupt commands.

For a better understanding of the present invention, together with other and further advantages and features thereof, reference is made to the description taken in connection with the accompanying drawings, the scope of the invention being pointed out in the appended claims.

BRIEF DESCRIPTION OF THE DRAWINGS

Referring to the drawings:

FIGS. 6A, 6B, and 6C illustrate logic and conditions pertaining to operation of the read gate in FIG. 3.

DETAILED DESCRIPTION

Figure 1:
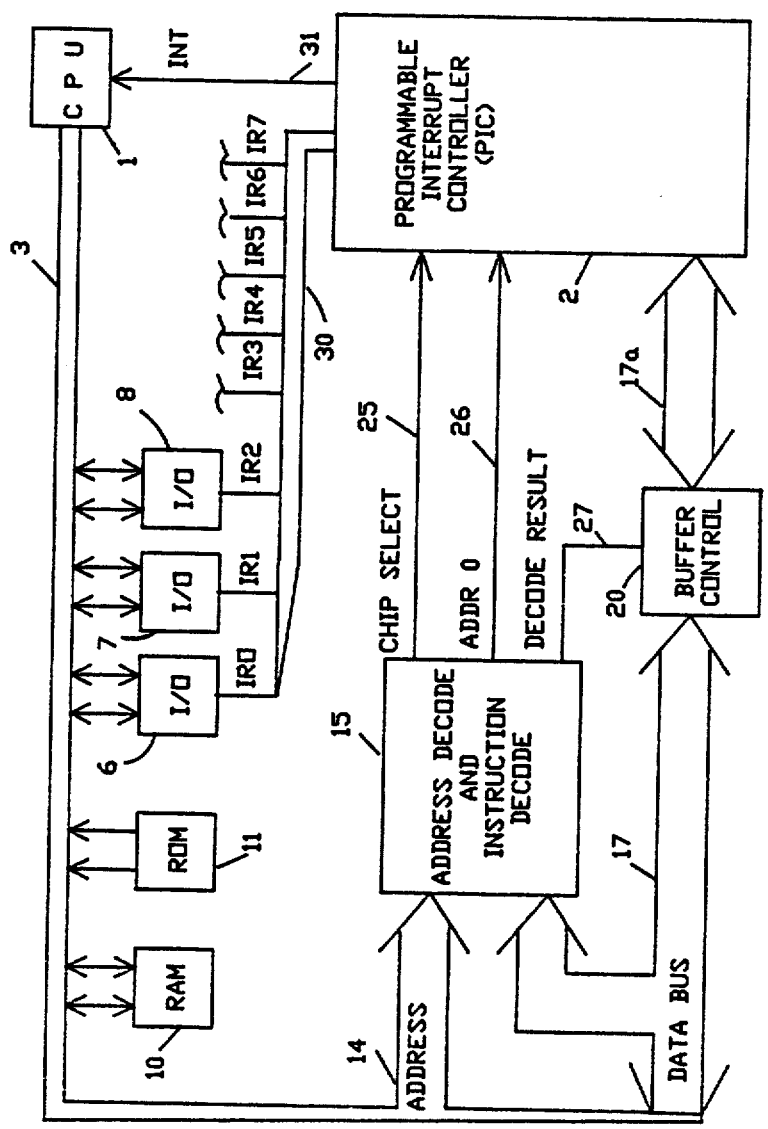
FIG. 1 illustrates a computer system including a CPU, a programmable interrupt controller and decode and buffer control logic for processing interrupt command signals in accordance with the present invention.

The computer system in FIG. 1 includes a Central Processing Unit (CPU) 1 interconnected with a Programmable Interrupt Controller (PIC) 2 and by way of bus 3 (comprising address bus 14 and data bus 17) with other elements including Input/Output (I/O devices 6-8, a Random Access Memory (RAM) 10 and Read Only Memory (ROM) 11.

Address Signals are directed by bus 14 to Address Decode and Instruction Decode block 15 and Data Signals by data bus 17 to block 15 and Buffer Control Logic 20. Various data, status, and control signals are supplied such as Chip Select on line 25, Address "0" on line 26 and Decode Result on line 27, which represents a -Write Gate (line 27a, FIG. 3) or -Read Gate signal (line 27b, FIG. 3). Buffer Control provides data by way of bus 17a to Interrupt Controller 2.

Programmable Interrupt Controller 2 handles up to eight vectored priority interrupts for CPU 1 by way of the eight line IR0, IR1, IR2, etc. to IR7 via bus 30. Only three I/O devices 6-8 are shown connected in the system of FIG. 1 to lines IR0, IR1 and IR2.

Interrupt Controller 2 functions as an overall manager. It accepts requests from the I/O devices, determines which of the incoming requests is of the highest importance (priority), ascertains whether an incoming request has a higher priority value than the level currently being serviced, and issues an interrupt via (INT) line 31 to the CPU based on this determination.

Each I/O device usually has a special program or "routine" that is associated with its specific functional or operational requirements which is referred to as a "service routine". Interrupt Controller 2, after issuing an interrupt to CPU 1, supplies information to CPU 1 that can "point" the Program Counter to the service routine associated with the requesting device. This "pointer" is an address in a vectoring table and is typically referred to as vectoring data.

A selection of priority modes is available to the programmer so that the manner in which the requests are processed by Interrupt Controller 2 can be configured to match system requirements. The priority modes can be changed or reconfigured dynamically at any time during the main program. Thus, the interrupt structure can be defined as required.

The interrupt sequence is fully described in the above referenced Microsystem Components Handbook.

PROGRAMMING THE 8259A

Interrupt Controller 2 accepts two types of command words generated by CPU 1.

Figure 2A:
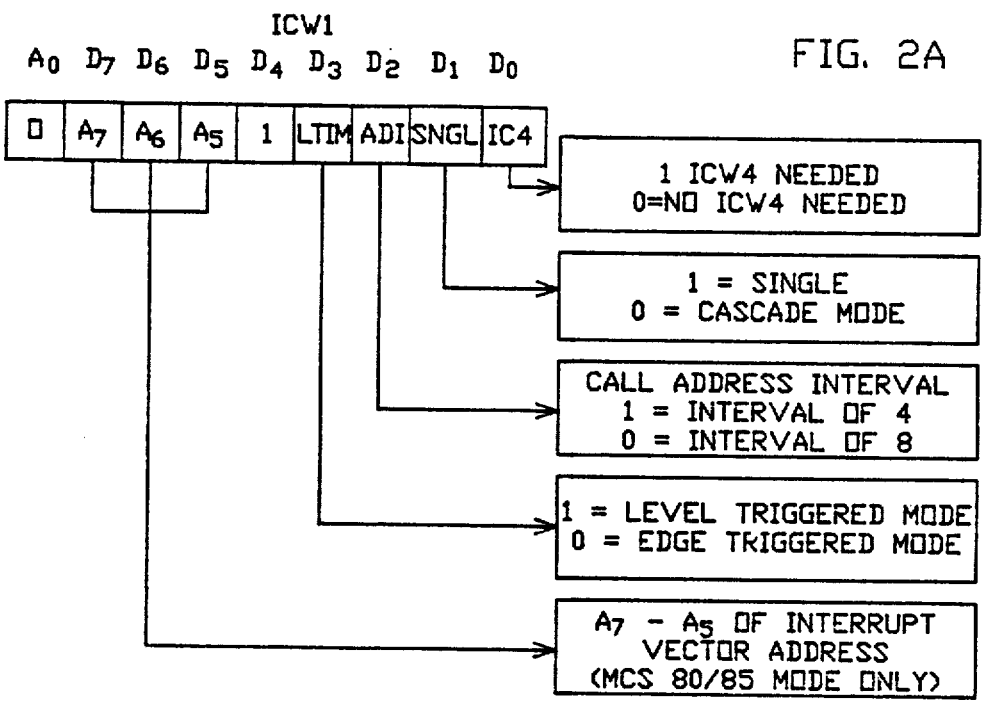
FIGS. 2A and 2B respectively, the format of a representative Initialization Command Word (ICW1) and an Operation Command Word (OCW1) used in the system of FIG. 1.

(1) Initialization Command Words (ICWs): The format of ICW1 is shown in FIG. 2A. Before normal operation can begin, Interrupt Controller 2 must be brought to a starting point by a sequence of 2 to 4 bytes timed by WR pulses.

Figure 2B:
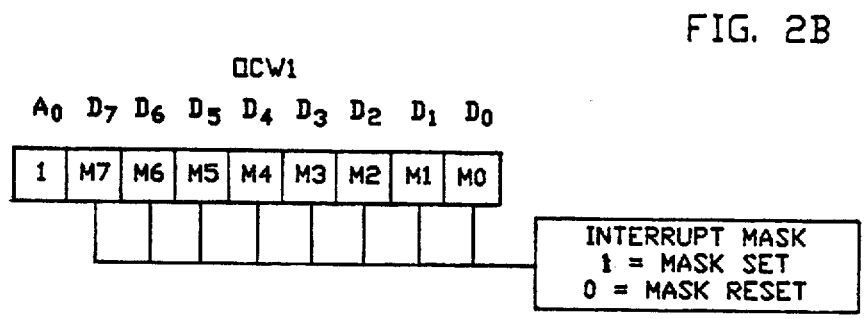

(2) Operation Command Words (OCWs): The format of OCW1 is shown in FIG. 2B. These are the command words which command the 8259A to operate in various interrupt modes. These modes are described in the referenced handbook and are:

(a) Fully nested mode
(b) Rotating priority mode
(c) Special mask mode
(d) Polled mode The OCWs can be written into the 8259A anytime after initialization.

Whenever a command is issued with A0=0 and D4=1, this is interpreted as Initialization Command Word 1 (ICW1), FIG. 24, ICW1 starts the initialization sequence during which the following automatically occur.

(a) The edge sense circuit is reset, which means that following initialization, an interrupt request (IR) input must make a low-to-high transition to generate an interrupt.

(b) The Interrupt Mask Register is cleared.
(c) IR7 input is assigned priority 7.
(d) The slave mode address is set to 7.
(e) Special Mask Mode is cleared and Status Read is set to IRR.
(f) If IC4=0, then all functions selected on ICW4 are set to zero.

The edge and level triggered modes are programmed using bit 3 in ICW1. Refer to FIG. 2A.

If LTIM='0', an interrupt request will be recognized by a low to high transition on an IR input. The IR input can remain high without generating another interrupt. If LTIM='1', an interrupt request will be recognized by a 'high' level on an IR input, and there is no need for an edge detection. The interrupt request must be removed before the EOI command is issued or the CPU interrupt is enabled to prevent a second interrupt from occurring.

The computer system in FIG. 1 is configured to normally operate with software, such as application programs, which supply interrupt related commands (ICW1) at initialization time that primarily establish a level sensitive mode for Interrupt Controller 2. It is desirable to maintain Interrupt Controller 2 in such level sensitive mode to enhance performance and "reduce noise problems" which result in false detection of an interrupt. When this is done, however, software that supplies edge sensitive command signals such as an edge mode ICW1 at initialization time becomes incompatible. If the Interrupt Controller 2 is programmed to edge triggered mode, by software written for other computer systems, the system will not complete the interrupt sequence. Logic is added to prevent initializing the controller to edge triggered mode. This feature enables program compatibility with other systems. A system without this feature is likely to be less compatible to pre-existing Personal Computer Software applications.

In FIG. 1, whenever an edge trigger command is decoded by block 15, the Buffer Control logic block 20 traps the commands and the controller is conditioned to respond in the same manner as if a level sensitive command was received.

The edge triggered mode occurs during the first initialization command word (ICW1). The occurrence of this condition is detected and the LTIM data bit for mode set on bus 17a is forced to be at a level sensitive mode. The logic required for this function in block 20 includes tri-state buffers to gate the bi-directional data, with a small amount of support logic to do the decode. Details are shown in FIG. 3.

Figure 3:
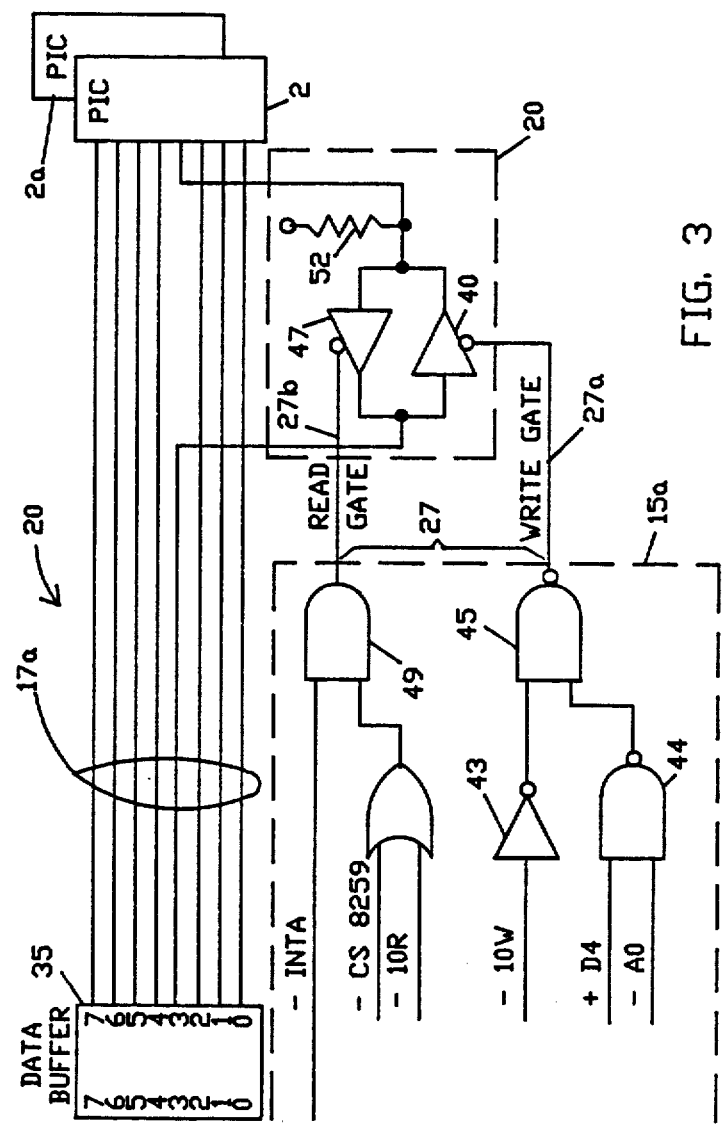
FIG. 3 shows details of the buffer control logic of FIG. 1 including a write gate and read gate.

In FIG. 3, a data buffer 35 is shown that supplies data via bus 17a to the Interrupt Controller (PIC) 2. Another PIC 2a can be provided, if desired, with appropriate selection of either one during operation. Buffer Control Logic 20 comprises blocks 40 and 47 and a pull up resistor 52. As noted the Decode Result 27 represents either a -Write Gate Signal on line 27a or a -Read Gate Signal on line 27b from a port in 15a of the Address Decode and Instruction Block 15. A -Write Gate Signal to block 40 controls write operations involving Interrupt Controllers 2 or 2a. Other Write logic includes blocks 43–45. A -Read Gate Signal to block 47 controls read operations involving Interrupt Controllers 2 and 2a. Other Read logic includes blocks 48 and 49.

Figure 4:
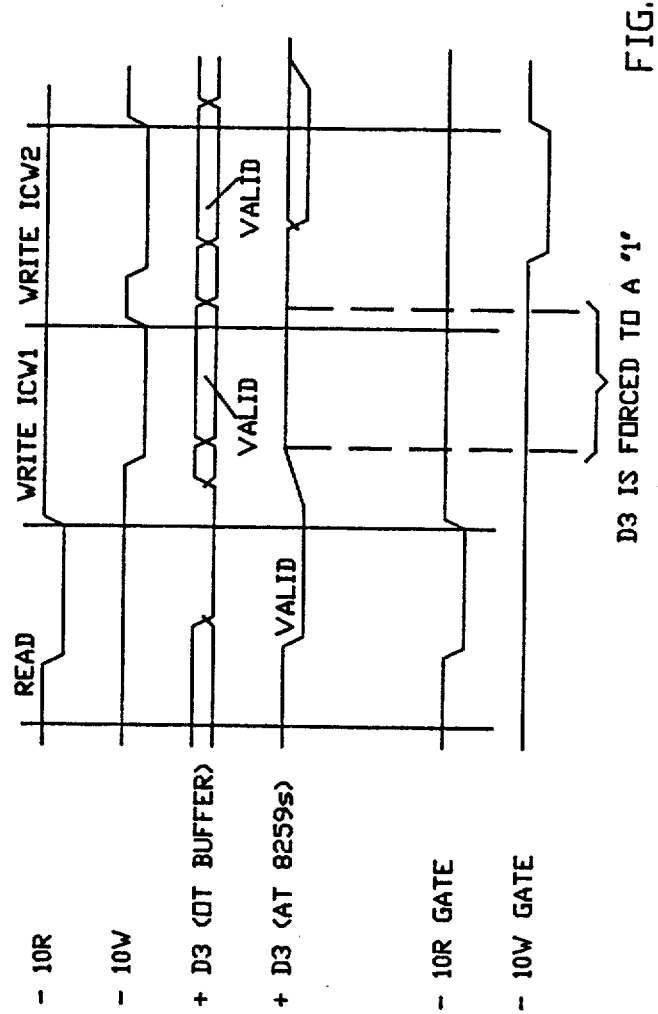
FIG. 4 is a timing chart showing signal waveforms occurring during initialization of the programmable interrupt controller, especially showing use of the ICW1 command word.

In FIG. 3, when writing a command word to one of the Interrupt Controllers 2 or 2a, the -Write Gate on line 27a is active except during a write for the command ICW1. By not activating -Write Gate during a write for ICW1, Data Bit 3 in the command is maintained at a high value by the pull-up resistor 52. When Data Bit 3=1 during a write to ICW1, the selected Interrupt Controller is set to or remains at level-sensitive mode. The status and conditions of the various control and data lines for Read and Write operations, but especially Write ICW1 are shown in FIG. 4.

Figures 5A, 5B, 5C:
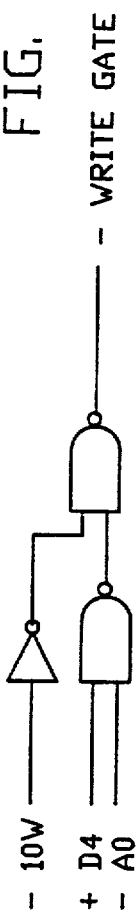
FIG. 5A, 5B, and 5C illustrate logic and conditions pertaining to operation of the write gate in FIG. 3.

The logic development for control of Write operations is illustrated in FIGS. 5A-5C as based on the following parameters:

WRITE GATE

Purpose

Do not allow data from the XDATA bus to be directed to the 8259 when the first initialization command word (ICW1) is being written.

$$ICW1 = I/O \text{ Write when } (A0 = 0 \text{ and } D4 = 1)$$
$$(Trap)$$

The logic development for control of Read operations is illustrated in FIGS. 6A-6C as based on the following parameters:

READ GATE

Purpose

Allow data from the 8259 to be directed to the XDATA bus during a read cycle to the chip or during an INTA cycle to the chip.

Therefore, whether the controllers were intended to be programmed to level or edge mode, the circuit always modifies the command to level mode.

Further, it is evident that the inventive principles set forth herein can be applied to level to edge command conversion or to conversion of command types other than interrupt commands and under other circumstances where it is desirable to establish compatibility among several otherwise incompatible systems, programs, or software.

Additionally or alternately, the Write gate signal may be used to signal the processing unit that an edge triggered command has been detected. This information may be used by the processor to flag other defects (time dependant code, incomplete I/0 decodes, attempts to transfer data with unattached equipment) which may be associated with edge triggered commands. The processing unit may then elect to discontinue the operation, modify the operation or continue with the defects.

While a preferred embodiment of the invention has been illustrated and described, it is to be understood that there is no intention to limit the invention to the precise construction herein disclosed and the right is reserved to all changes and modifications coming within the scope of the invention as defined in the appended claims.

We claim:

1. A computer system normally designed for operation with certain software commands in a first interrupt command mode and including (1) a bus over which commands are transmitted and (2) logic for sending at least one initialization command on said bus to cause setup for said first interrupt command mode, said computer system comprising:

a programmable device controllable by a command to operate in either a first interrupt command mode or a second interrupt command mode and connected to receive commands over said bus, said programmable device being set by said initialization command to said first interrupt command mode; and detecting means connected to said bus to intercept commands prior to receipt by said programmable device, for detecting software commands in said second interrupt command mode, converting said second type signal command mode command to a corresponding first interrupt command mode command and applying said converted command to said bus for receipt by said programmable device.

2. The system of claim 1 wherein said initialization command is supplied by said computer during an initialization period for set up of said programmable device.

3. The system of claim 1 wherein said first interrupt command mode is a level sensitive command mode and said second command mode is an edge triggered command mode.

4. The system of claim 1 wherein said commands comprise a predetermined number of data and command bits and the detection of first interrupt command mode commands and second interrupt command mode commands is effected by logical inspection of a particular bit position in said commands and wherein said circuitry converts said particular bit position to a state for first interrupt command mode prior to transmission to said programmable device.

5. A computer system which is normally designed for operation with software commands in a level sensitive mode and includes a bus for transmitting commands, said computer system comprising:

a programmable interrupt controller connected to said bus and capable of operating either in an edge triggered mode or a level sensitive mode; and detecting means connected to said bus to receive commands prior to transmission to said interrupt controller, for detecting software commands in either of said modes, for converting an edge sensitive mode command to a corresponding level sensitive mode command and applying a command so converted to said bus for receipt by said programmable interrupt controller.

6. The system of claim 5 wherein said detecting means comprises buffer control logic having Write and Read control elements to control transfer of data to and from said programmable interrupt controller during system operations, said buffer control logic being operable under control of computer signals to decode any second mode software command and force said command to assume a first mode command status.

7. The system of claim 6 wherein said commands comprise a predetermined number of data bits and the distinction between a first mode command and a second mode command is determined by logical inspection of a particular bit position in said command words and wherein said buffer control logic converts said particular bit position to a first mode status bit prior to transmission to said programmable interrupt controller.

8. The system of claim 5 wherein said commands are supplied by said computer during an initialization period for set up of said programmable interrupt controller in the level sensitive mode.

9. The system of claim 5 wherein said detecting means directs a signal to said computer indicative of a mode conversion from said edge triggered mode command to said level sensitive mode command whereby said computer further determines whether the software which generated said edge triggered mode command is compatible with said computer system.

10. A computer system including a bus over which commands are transmitted which is designed for operation with software commands in a selected one of a level sensitive or edge triggered modes comprising:

a programmable interrupt controller connected to said bus and capable of operating either in edge triggered mode or said level sensitive mode; and detecting means connected to said bus to receive commands prior to transmission to said interrupt controller, for detecting software commands in either said mode, for converting commands of the unselected mode to corresponding selected mode commands and for applying commands after such selective conversion to said bus for receipt by said programmable interrupt controller.

11. The system of claim 10 wherein said detecting means comprises buffer control logic having Write and Read control elements to control transfer of data to and from said programmable interrupt controller during system operations, said buffer control logic being operable under control of computer signals to decode any software command not selected and preferred and force said command to be treated as a selected and preferred command status.

12. The system of claim 10 wherein said detecting means directs a signal to said computer indicative of a mode conversion from a software command not of the selected mode to a software command of the selected mode.

* * * * *